United States Patent [19]

Van Wieran

[11] Patent Number: 5,740,997
[45] Date of Patent: Apr. 21, 1998

[54] PNEUMATIC HEIGHT ADJUSTMENT COLUMN FOR A CHAIR

[75] Inventor: Steve Van Wieran, Grandvillo, Mich.

[73] Assignee: Herman Miller, Inc., Zeeland, Mich.

[21] Appl. No.: 486,716

[22] Filed: Jun. 7, 1995

[51] Int. Cl.[6] ............................................. F16M 11/00
[52] U.S. Cl. .............................. 248/404; 248/161; 403/155; 403/315
[58] Field of Search ................................ 248/161, 404, 248/415, 631, 575; 297/344.19; 403/150, 154, 155, 315

[56] References Cited

U.S. PATENT DOCUMENTS

| | | | |
|---|---|---|---|
| 3,436,048 | 4/1969 | Greer | 248/397 |
| 3,547,394 | 12/1970 | Wehner . | |
| 3,788,587 | 1/1974 | Stemmler | 248/631 X |
| 3,828,651 | 8/1974 | Dorner et al. . | |
| 3,891,270 | 6/1975 | Crossman et al. | 297/344.19 |
| 4,108,416 | 8/1978 | Nagase et al. | 248/400 |
| 4,245,826 | 1/1981 | Wirges | 267/131 |
| 4,415,135 | 11/1983 | French | 248/161 |
| 4,485,996 | 12/1984 | Beukema et al. | 248/407 |
| 4,580,749 | 4/1986 | Howard | 248/161 |
| 4,595,237 | 6/1986 | Nelsen | 248/404 X |
| 4,692,057 | 9/1987 | Lauderbach | 403/334 |
| 4,720,068 | 1/1988 | Tornero | 288/162.1 |
| 4,756,496 | 7/1988 | Hosan et al. | 248/161 |
| 4,793,197 | 12/1988 | Petrovsky | 74/89.15 |
| 4,844,392 | 7/1989 | Bauer et al. | 248/162.1 |
| 4,848,524 | 7/1989 | Hosan et al. | 188/322.17 |
| 4,899,969 | 2/1990 | Bauer et al. | 248/161 |
| 4,940,202 | 7/1990 | Hosan et al. | 248/162.1 |
| 4,969,619 | 11/1990 | Bauer et al. | 248/161 |
| 4,979,708 | 12/1990 | Bauer et al. | 248/631 |
| 4,997,150 | 3/1991 | Mardollo | 248/161 |
| 5,012,996 | 5/1991 | Poertzgen et al. . | |
| 5,078,351 | 1/1992 | Gualtieri | 248/161 |
| 5,120,011 | 6/1992 | Mintgen et al. | 248/162.1 |
| 5,149,035 | 9/1992 | Bonnerma et al. | 248/415 X |
| 5,234,187 | 8/1993 | Teppo et al. | 248/161 |

FOREIGN PATENT DOCUMENTS

| | | | |
|---|---|---|---|
| 81210414 | 3/1993 | China | A47C 3/30 |
| 0483806 A1 | 5/1992 | European Pat. Off. | A47B 9/10 |
| 2031057 | 4/1980 | United Kingdom | F16B 2/16 |

*Primary Examiner*—Derek J. Berger
*Attorney, Agent, or Firm*—Brinks Hofer Gilson & Lione

[57] ABSTRACT

A pneumatic height adjustment column is provided for a chair. The column includes a support tube, a carrier tube, a pneumatic cartridge, a hub fastener, and a shaft fastener. The support tube has a top end which is generally open, and a bottom portion which is adapted to be mounted to a chair base. The bottom portion has an opening with a smaller diameter than that of the support tube. The carrier tube has a top portion adapted to be mounted to a support housing for a chair seat. The top portion has an opening with a smaller diameter than that of the carrier tube. The carrier tube also has a generally open bottom end which telescopically engages the top end of the support tube. The pneumatic cartridge has a cylinder positioned within the carrier tube, a shaft, and a hub. The cylinder has a diameter greater than that of the opening in the carrier tube. The shaft extends downwardly from the cylinder and has a bottom end which passes through the opening in the bottom of the support tube. The hub is disposed on a top portion of the cylinder and passes through the opening in the top of the carrier tube. The hub fastener releasably engages the hub and maintains the position of the hub through the opening in the top of the carrier tube. The shaft fastener is attached to the shaft and maintains the position of the bottom end of the shaft through the opening in the bottom of the support tube.

53 Claims, 5 Drawing Sheets

5,740,997

PNEUMATIC HEIGHT ADJUSTMENT COLUMN FOR A CHAIR

BACKGROUND OF INVENTION

The present invention relates generally to support columns for chairs, and more particularly, to pneumatic height adjustment columns.

In general, a chair's seating surface, or seat, is maintained at an elevated level to provide a user with support while in a sitting position. Typically, the seat is elevated by interposing a support structure between the seat and the surface above which it is positioned. Support structures come in a variety of forms. For example, a plurality of legs can support the seat. In another form, the support structure consists of a single support column, which eliminates the need for multiple load bearing members and improves the aesthetics of the chair. Support columns have also been made height adjustable to accommodate both a variety of users and a variety of uses for the chair. For example, a height adjustable chair can be raised or lowered to accommodate users of different heights. Similarly, the height adjustable chair can be raised or lowered to provide a fixed seating surface at a plurality of elevated work stations. Therefore, a single user may use the chair at different heights, regardless of their height characteristics. To accommodate a wide range of users and uses, it is therefore important to maximize the stroke of the support column, i.e., the difference between the lowest elevation and the greatest elevation of the chair.

Height adjustable chairs typically include a pneumatic height adjustment column for supporting the chair. A pneumatic height adjustment column generally includes a pneumatic cartridge disposed in a telescopically movable carrier tube that engages a support tube. Generally, the pneumatic cartridge includes a cylinder and a shaft, and is retained in the tube by securing a bottom of the cylinder to the carrier tube using a securing element such as a nut or clip. Other securing elements can secure the top of the cartridge to the carrier tube, but are typically positioned inside the tube. The securing element prevents the cartridge from falling out of the tube during installation and prevents the cartridge from becoming disengaged from the carrier tube when the chair is lifted upwardly. The securing element can also maintain the relationship of the pneumatic cartridge within the tube such that an unintentional slackening of the column is reliably avoided when the chair is raised upwardly by the tube structure.

Securing the pneumatic cartridge inside the tube structure has several disadvantages, however. For example, when the securing element attaches to the bottom of the cartridge cylinder, the height of the support column at a fully compressed position necessarily includes the height of the compressed pneumatic cartridge cylinder and the height of the securing element. Therefore, the overall stroke of the support column is reduced by the amount of internal space occupied by the nut or other securing element inside the tube structure. This is also true of securing elements, interconnecting the top of the pneumatic cartridge and the carrier tube, that are positioned inside the carrier tube.

In addition, the typical support column secured at the bottom of the cylinder can experience premature failure at the seal interfacing the cylinder and shaft of the pneumatic cartridge. This failure is experienced when the cylinder is forced to take up bending stresses. For example, when a user sits off center in the chair, a bending moment is applied to the support column. This moment must be carried by the support column to the base. By securing the pneumatic cartridge to the tube at both ends of the cylinder, the pneumatic cartridge is forced to absorb some of the bending moment and resultant bending stresses imposed on the tube.

Because pneumatic cartridges can be damaged or worn out, it is important for the cartridge to be easily removed from the cylinder. Accordingly, the securing element must releasably engage either the cartridge or the carrier tube, such that the cartridge can be disengaged from the tube. For example, a spring clip can be mounted inside the carrier tube and can be adapted to releasably engage the pneumatic cartridge. Alternatively, many of the current securing devices accomplish releasable engagement by engaging threads disposed on the carrier tube. For example, U.S. Pat. No. 4,940,202 entitled Steplessly Adjustable Vertical Movement Device and issued to Hosan et al., discloses a pneumatic catridge having a securing element attached to the top of it. The pneumatic cartridge is removed by turning the pneumatic catridge and the attached securing element through an internal threading in the top of the carrier tube. However, if the threads are damaged, the carrier tube may have to be discarded. Similarly, if a spring clip is located inside the carrier tube, the entire tube may have to be discarded if the clip is damaged.

Finally, most securing elements, whether positioned inside or outside the carrier tube, interconnect only the pneumatic cartridge and carrier tube, and do not additionally interconnect the carrier tube and the seat. For example, the securing element disclosed in the Hosan et al. patent does not secure the carrier tube to the seat. Indeed, when located inside the carrier tube, the securing element is incapable of making this attachment. Thus, most securing elements do not provide a secondary retention device for preventing the seat from becoming disengaged from the support column.

SUMMARY OF THE INVENTION

Briefly stated, the invention is directed to a pneumatic height adjustment column for a chair. The support column includes a support tube, a carrier tube, a pneumatic cartridge, a hub fastener and a shaft fastener. The support tube has a top end which is generally open, and a bottom portion adapted to be mounted to a chair base. The bottom portion includes an opening with a smaller diameter than that of the support tube. The carrier tube has a top portion adapted to be mounted to a chair seat, which includes an opening with a smaller diameter than that of the carrier tube. The carrier tube also has a generally open bottom end which telescopically engages the top end of the support tube. The pneumatic cartridge includes a cylinder which is positioned within the carrier tube, and has a diameter greater than that of the opening in the top portion of the carrier tube. The cartridge also has a shaft extending downward from the cylinder. The shaft has a bottom end which passes through the opening in the bottom of the support tube. The pneumatic cartridge also includes a hub disposed on a top portion of the cylinder. The hub passes through the opening in the top of the carrier tube. The hub fastener releasably engages the hub and maintains the position of the hub through the opening in the top of the carrier tube. The shaft fastener is attached to the shaft and maintains the position of the bottom end of the shaft through the opening in the bottom of the support tube.

One object of the present invention is to provide a pneumatic height adjustment column whereby the stroke of the column is maximized. By providing a hub and externally securing the pneumatic cartridge to the carrier tube at the top of the carrier tube, the hub fastener does not increase the internal height of the support column when fully compressed, regardless of the fastener's thickness. Similarly, the fastener does not interfere with the maximum extension of the support column. Thus, the present invention provides a significant advantage over other support columns.

Another object of the invention is to provide a support column whereby the portion of the bending moment carried by the pneumatic cartridge is greatly reduced, thereby increasing the life of the cartridge. By attaching the top of the pneumatic cartridge to the top of the carrier tube, rather than fixing it to the carrier tube at the lower portion of the cylinder, the cartridge is precluded from carrying the bending moment and the resultant bending stresses.

In a preferred embodiment, the hub disposed on top of the pneumatic cartridge cylinder has a circumferential groove. The hub fastener is Y-shaped, having two resilient members and an enlarged portion. The resilient members form an opening between them. When installed, the resilient members are disposed in the groove and engage the hub, thereby preventing the cylinder from falling into the carrier tube when the support column is raised upwardly by the carrier tube. Moreover, the hub fastener is curved such that it biases the cartridge upwardly against the carrier tube, thereby eliminating any unintentional slackening or chatter when the chair is lifted upwardly. In addition, the hub fastener engages the seat, thereby preventing the seat from becoming disengaged from the carrier tube.

The present invention also provides for a method of assembling the pneumatic height adjustment column. The method includes inserting the pneumatic cartridge in the carrier tube such that the hub passes through the opening in the top portion of the carrier tube. The pneumatic cartridge is then secured in the carrier tube by attaching the hub fastener to the hub. The carrier tube and pneumatic cartridge are then inserted into the support tube. When inserting the carrier tube and pneumatic cartridge in the support tube, the bottom end of the shaft is passed through the opening in the bottom portion of the support tube and the bottom end is secured with a shaft fastener. When using the preferred embodiment, the hub fastener can also be removed without destroying it, thereby allowing for repeated use of the fastener over the life of the chair.

The present invention, together with further objects and advantages, will be best understood by reference to the following detailed description taken in conjunction with the accompanying drawings.

DETAILED DESCRIPTION OF THE PREFERRED EMBODIMENT

Figure 1:
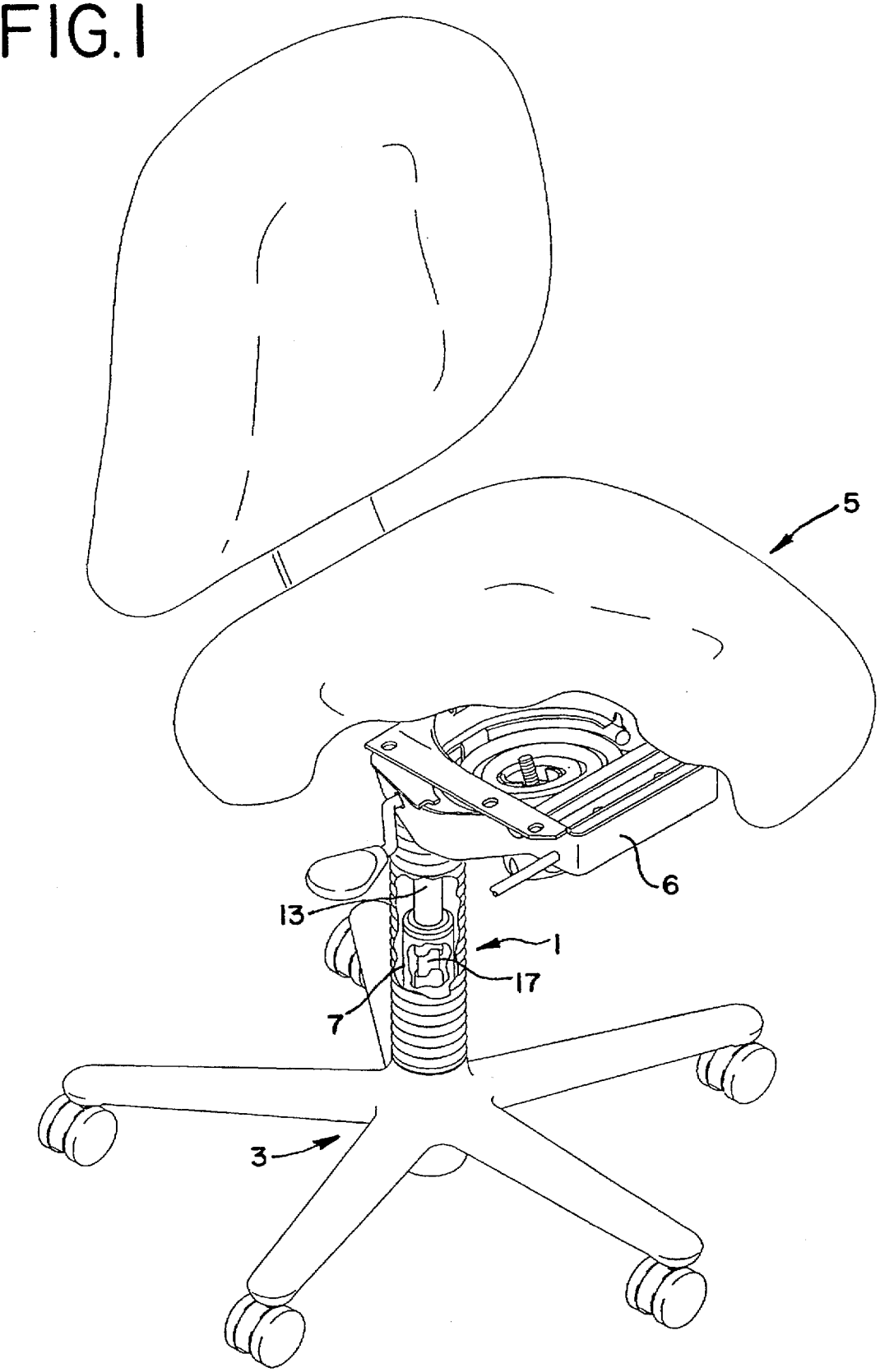
FIG. 1 is a perspective, with parts broken away for clarity, of a height adjustable chair, including a base, a pneumatic height adjustment column and a seat.
Figure 2:
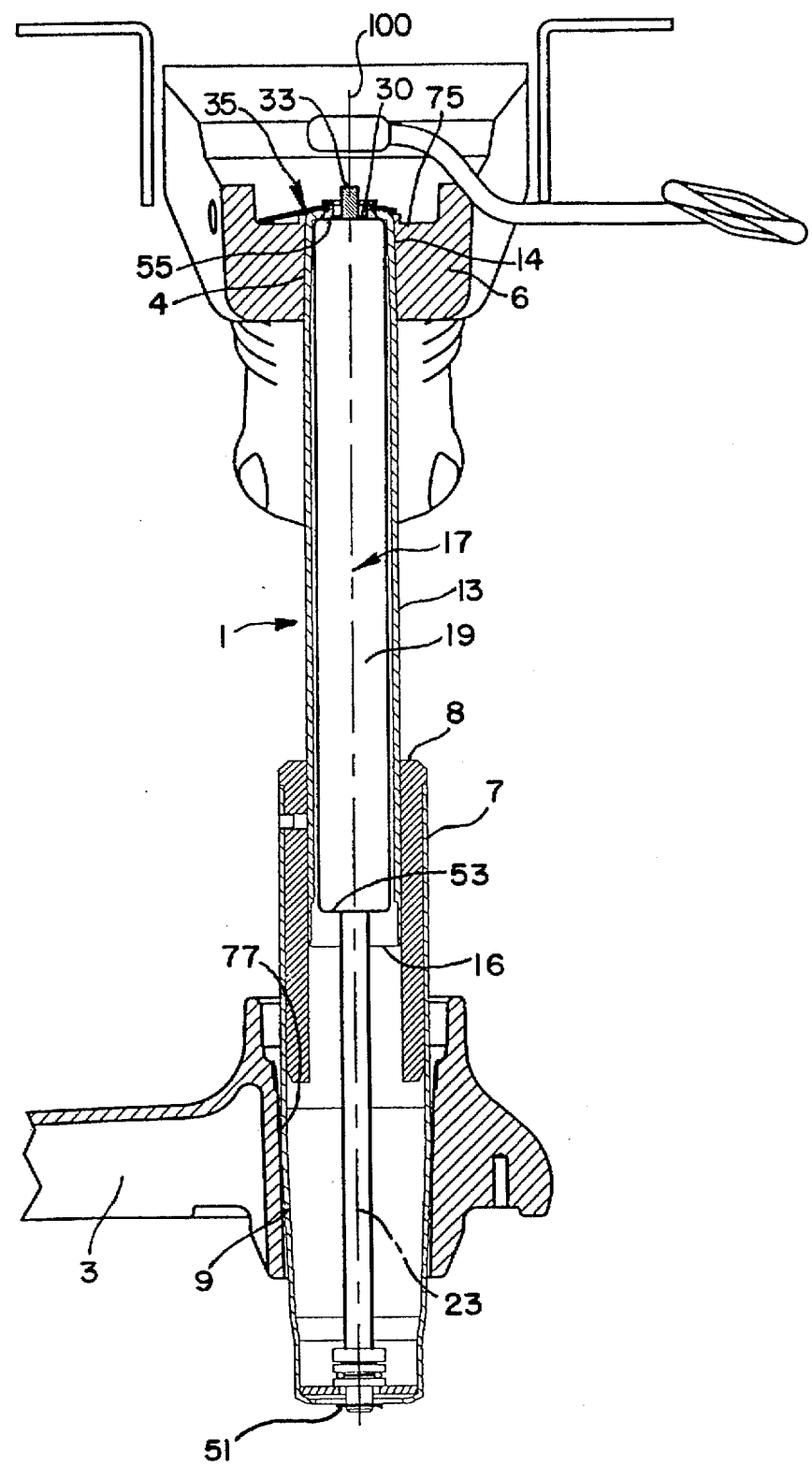
FIG. 2 is a cross-sectional view of the pneumatic height adjustment column in a fully extended position with a base and seat support applied thereto.
Figure 3:
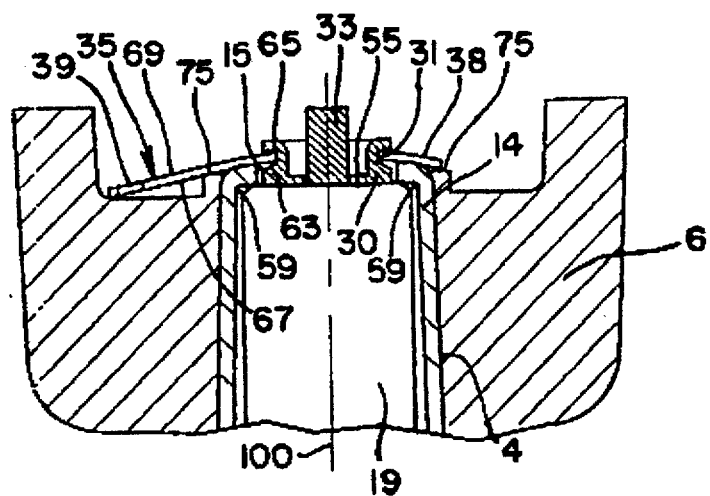
FIG. 3 is an enlarged representation of a cross-sectional view of the top of the pneumatic height adjustment column with a seat support applied thereto.
Figure 5:
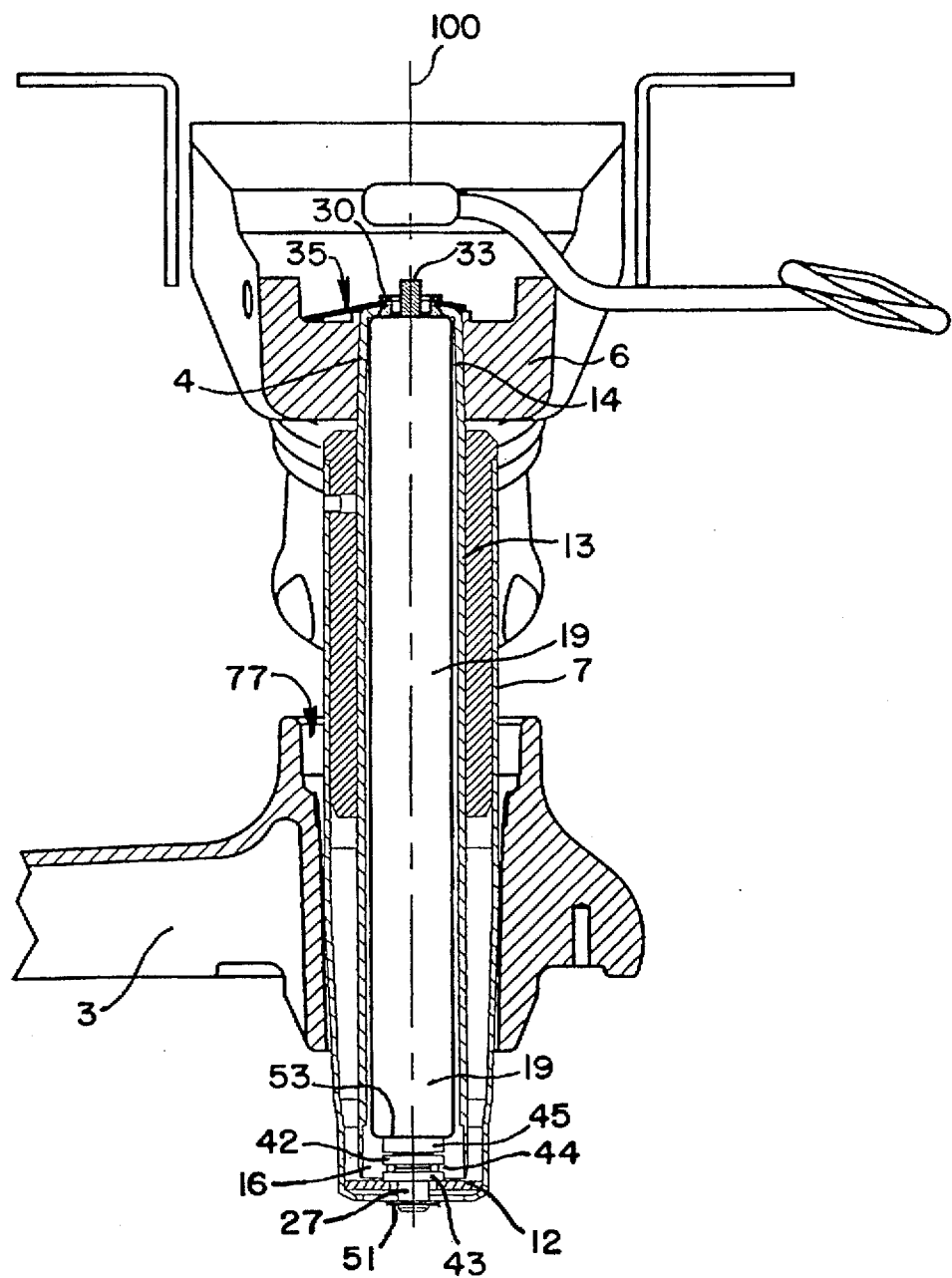
FIG. 5 is a cross-sectional view of the pneumatic height adjustment column in a fully compressed position with a base and seat support applied thereto.

Referring to the drawings, FIGS. 2 and 5 show a pneumatic height adjustment column 1 including a support tube 7, a carrier tube 13, a pneumatic cartridge 17, a hub fastener 35 and a shaft fastener 51. As shown in FIGS. 2 and 3, the carrier tube 13 has a top portion 14 which is adapted to be mounted to a chair seat 5. The chair seat 5 includes a support housing 6 which has a tapered bore 4 adapted to receive the top portion 14 of the carrier tube 13, which is also tapered, as shown in FIGS. 2 and 3. The carrier tube 13 is mounted to the support housing 6 by press fitting the tapered top portion 14 of the carrier tube 13 within the tapered bore 4. Because the weight of the user is transferred from the seat 5 to the carrier tube 13 at the tapered interface, the corresponding tapers of the top portion 14 of the carrier tube 13 and the bore 4 in the support housing prevent the carrier tube 13 from passing through the bore 4 when a user occupies the seat 5.

As shown in FIG. 2, a base 3 also has a tapered bore 77 adapted to receive a tapered bottom ,portion 9 of the support tube 7. The support tube 7 is press fitted into the tapered bore 77 of the base 3, thereby providing for a proper load transfer between the support tube 7 and the base 3.

As shown in FIGS. 2 and 5, the carrier tube 13 includes a bottom end 16 which is generally open. The bottom end 16 of the carrier tube 13 is telescopically received in a generally open top end 8 of the support tube 7. As the pneumatic height adjustment column moves between a fully extended position, as shown in FIG. 2, to a fully compressed position, as shown in FIG. 5, the carrier tube 13 slidably engages the support tube 7. At a fully extended position, a portion of the carrier tube 13 must remain engaged with a portion of the support tube 7 in order to provide a sufficient contact surface for reacting against the bending moment produced by a user sitting off-center in the seat. In a preferred embodiment, about two inches of the carrier tube 13 remains engaged with the support tube 7 at a fully extended position, as shown in FIG. 2.

Figure 8:
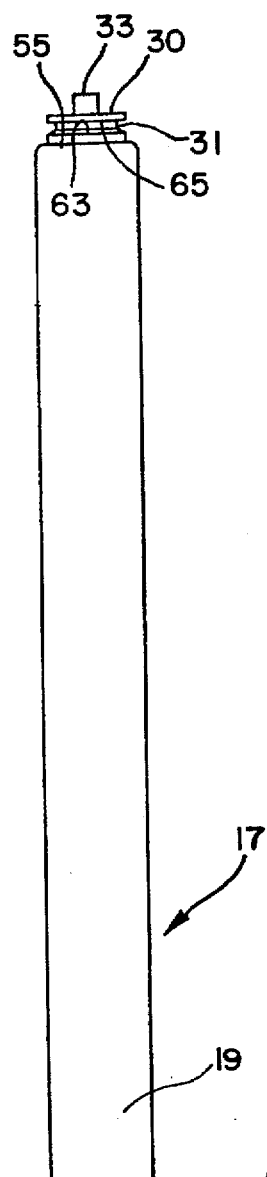
FIG. 8 is a view of the pneumatic cartridge.
Figure 9:
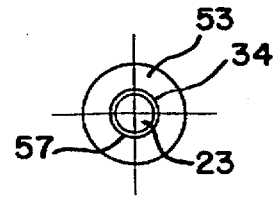
FIG. 9 is a cross-sectional view of the pneumatic cartridge take along line 9—9 of FIG. 8.

As shown in FIGS. 2 and 5, a pneumatic cartridge 17 is coaxially disposed in the carrier tube 13. The pneumatic catridge 17, carrier tube 13 and support tube 7 each have a longitudinal axis 100 as shown in FIGS 2–6. The pneumatic cartridge 17 includes a cylinder 19, a shaft 23, and a hub 30. The cylinder 19 has a top surface 55 and a bottom surface 53. The bottom surface 53 of the cylinder 19 has a hole 57 adapted to receive a shaft 23, which extends downwardly from the cylinder 19 as shown in FIGS. 8 and 9. The shaft 23 slidably engages the cylinder 19 and is connected to a piston disposed within the cylinder 19. When the pneumatic height adjustment column 1 is in a fully extended position, a substantial portion of the shaft 23 extends downwardly from the cylinder 19 as shown in FIG. 2. When in a fully compressed position, a substantial portion of the shaft 23 is disposed within the cylinder 19 as shown in FIG. 5. A seal 34 is interposed between the shaft 23 and the cylinder 19 at the bottom surface 53 of the cylinder 19 as shown in FIG. 9.

As shown in FIGS. 2 and 3, the hub 30 of the pneumatic cartridge is disposed on the top surface 55 of the cylinder 19.

When the pneumatic cartridge 17 is disposed in the carrier tube 19, the hub 30 passes through an opening 15 in the top portion 14 of the carrier tube 13. The diameter of the opening 15 in the carrier tube 13 is smaller than the outer diameter of the cylinder 19 such that the top 55 surface of the cylinder engages a shoulder 59 of the carrier tube 19 as shown in FIG. 3, thereby preventing the cylinder 19 from passing through the opening and providing a load path to transfer a downward vertical load from the carrier tube 19 to the pneumatic cartridge 17. As shown in FIGS. 2 and 3, an actuating button 33 extends through the hub 30 and slidably engages the cylinder 19. When depressed, the actuating button 33 actuates a gas spring contained in the cylinder 19, thereby permitting the column to be raised or lowered.

As shown in FIGS. 2 and 3, a hub fastener 35 releasably engages the hub 30 as it protrudes through the opening 15 in the carrier tube 19. The hub fastener 35 maintains the position of the pneumatic cartridge 17 in the carrier tube 13 when the chair is lifted upwardly. When the chair is lifted upwardly, the support housing 6 transfers an upward force to the carrier tube 13. If the pneumatic cartridge 17 were not secured to the carrier tube 19, the carrier tube 13 would slide upwards in the support tube 7 until the carrier tube 13 and support tube 7 were disengaged. The hub fastener 35 is necessary to maintain the position of the pneumatic cartridge 17 in the carrier tube 13 and thereby ensure that the carrier tube 13 remains slidably engaged with the support tube 7. This is accomplished by securing the carrier tube 13 to the pneumatic cartridge 17 using the hub fastener 35 and by securing the support tube 7 to the pneumatic cartridge 17 using the shaft fastener 51.

The hub fastener 35 also functions as a secondary retention device that secures the support housing 6 to the carrier tube 13. As shown in FIG. 3, the hub fastener 35 is larger than the top opening of the tapered bore 4 in the support housing 6. Accordingly, the hub fastener 35 engages a top surface 75 of the support housing 6. Therefore, if the tapered portion 14 of the carrier tube 13 were to come loose from or not fit properly within the tapered bore 4 in the support housing 6, the hub fastener 35 ensures that the support housing 6 cannot be disengaged from the top portion 14 of the carrier tube 13. Thus, the hub fastener 35 functions as a secondary retention device between the column 1 and the support housing 6.

Figure 7A:
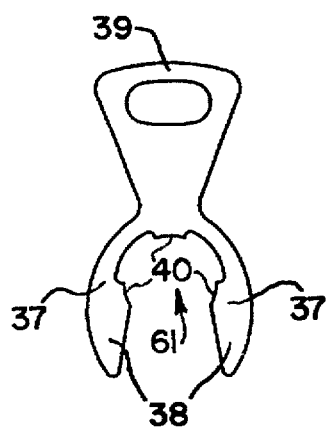
FIG. 7A is a top and side view of the hub fastener.
Figure 7B:
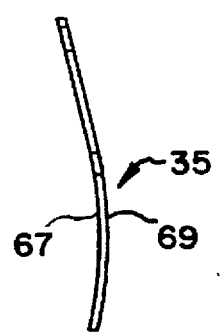
FIG. 7B is a side view of the hub fastener.

As shown in the preferred embodiment of FIGS. 7A and 7B, the hub fastener 35 has a pair of resilient members 37 and an enlarged portion 39. The resilient members have beveled ends 38 to facilitate the installation of the hub fastener 35. The resilient members 37 define an opening 61 between them and have three engagement tabs 40 extending inwardly into the opening 61. When the hub 30 is disposed in the opening, the engagement tabs 40 engage the hub 30. When installing the hub fastener 35, the beveled ends 38 are placed against the hub 30 and a lateral inward force is applied to the enlarged portion 39, thereby biasing the resilient members 37 outwardly as the members translate past the hub 30.

The beveled ends 38 provide an initial guide for positioning the hub fastener 35 on the hub 30 and facilitate the installation process by providing for a ramped installation force, whereby the lateral inward force applied to the fastener 35 is necessarily increased as the resilient members 37 slide past the hub 30 and are biased outwardly. Thus, a lesser force is required at the beginning of the installation, which appropriately corresponds to the point in time when the fastener 35 is not stabilized by the hub 30 and is guided only by the user. When the hub 30 is disposed in the opening, the resilient members 37 return to their original position so that the engagement tabs 40 engage the hub 30.

The hub fastener 35 is removed by applying an outward force to the enlarged portion 39. As the hub fastener 35 moves laterally outwardly, the resilient members 37 are biased laterally outwardly by the hub 30. When disengaged from the hub 30, the resilient members 37 return to their original position. Thus, the hub fastener 35 can be used repeatedly without destroying it. Moreover, because the hub fastener 35 is not fixedly attached to either the hub 30 or the carrier tube 13, it can be replaced easily and inexpensively without correspondingly having to replace the carrier tube 13 or pneumatic cartridge 17.

To remove and replace the pneumatic cartridge 17, the hub fastener 35 is removed and the seat 5, support housing 6 and carrier tube 13 are disengaged from the support tube 7 and pneumatic cartridge 17. The shaft fastener 51 is then removed, whereby the pneumatic cartridge 17 can be removed. Thus, the cartridge 17 can be replaced without having to remove the support housing 6 from the carrier tube 13 in order to access the hub 30.

In a preferred embodiment, the hub 30 has a circumferential groove 31 defined by a lower shoulder 63 and an upper shoulder 65. The resilient members 37 are disposed in the groove 31 and engage the upper shoulder 65 thereby preventing the hub 30 from passing downwardly through the opening 15 in the carrier tube 13. In the preferred embodiment, the hub fastener 35 is curved and has a lower concave surface 67, which is biased against the support housing 6 and a top surface 75 of the carrier tube 13 as shown in FIG. 2, 3 and 5. The hub fastener 35 also has an upper convex surface 69, which is biased against the upper shoulder 65 of the hub 30. The hub fastener 30 is curved so as to bias the cartridge 17 upwardly against the shoulder 59 of the carrier tube 13, thereby eliminating any unintentional slackening or chatter of the chair when lifted upwardly by the seat 5. In addition, the hub fastener 35 acts as a secondary retention device as previously described. Because the beveled ends 38 and enlarged portion 37 of the hub fastener 35 engages the support housing 6, the support housing 6 is prevented from becoming disengaged from the carrier tube 13.

In a preferred embodiment, the hub fastener 35 is made out of steel and has a thickness of about 0.030 to 0.050 inches. However, it should be understood that a variety of other materials and thicknesses are acceptable for the intended purpose of the fastener. Because the hub fastener 35 is located externally of the carrier tube 13, its thickness does not interfere with or decrease the stroke of the column.

Figure 4:
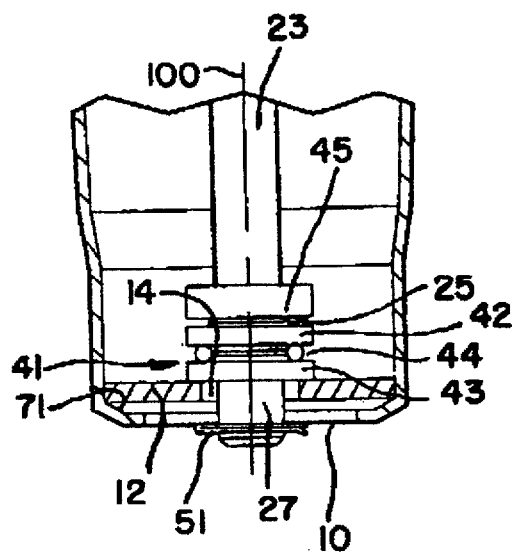
FIG. 4 is an enlarged representation of a cross-sectional view of the bottom of the pneumatic height adjustment column in a fully extended position as shown in FIG. 2.
Figure 6:
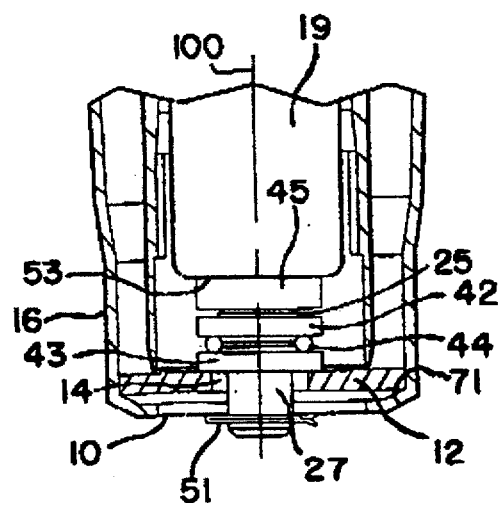
FIG. 6 is an enlarged representation of a cross-sectional view of the bottom of the pneumatic height adjustment column in a fully compressed position as shown in FIG. 5.

As shown in FIGS. 4 and 6, the shaft 23 of the pneumatic cartridge 17 is attached to a support plate 12 that is mounted to a bottom end 10 of the support tube 7. The bottom end 10 of the support tube 7 is generally open and includes a shoulder 71. The support plate 12 engages the shoulder 71 formed at the bottom end 10 of the support tube 7 as show in FIGS. 4 and 6. The tube 7 is crimped above the support plate 12 to secure it in place. Alternatively, the support plate can be welded to the support tube.

In another embodiment, the bottom end does not include a shoulder. Rather, the support plate is positioned in the opening of the bottom end and welded to the support tube. In yet another embodiment, the support plate is threaded and engages the corresponding threads disposed in the support tube.

The shaft 23 has a bottom end 27 which passes thorough an opening 14 in the support plate 12. The bottom end 27 of the shaft 23 has a groove 29. A shaft fastener 51 is disposed in the groove 29 so as to prevent the shaft 23 from passing back through the opening 14 in the support plate 12. Preferably, the shaft fastener 51 comprises a clip. Alternatively the shaft can have a hole in the bottom end adapted to receive a cotter pin. The bottom end can also be threaded to receive a nut.

The shaft 23 also includes a shoulder 25 located near the bottom end 27 of the shaft 23. The shoulder 25 is an integral part of the shaft 23. In alternative embodiments, the shoulder can be comprised of a nut screwed onto the shaft or a washer welded to the shaft.

A bearing set 41 is disposed on the shaft 23 between the support plate 12 and the shoulder 25 as shown in FIG. 4 and 6. The bearing set 41 includes a first washer 42, a second washer 43 and a plurality of ball bearings 44 captured between the washers. The bearing set 44 permits the pneumatic cartridge 17 and carrier tube 13 to rotate about a vertical axis as the user rotates the seat 5 about that axis. The bearing set 41 also prevents the shoulder 25 from passing through the opening 16 in the support plate 12. Alternatively, the shoulder can have a greater diameter than the opening and can directly bear up against the support plate. As shown in FIG. 4 and 6, a cushion member 45 is disposed on the shaft 23 around the shoulder 25 and extends above the upper surface of the shoulder 25. Preferably, the cushion member 45 is made out of rubber. The cushion 45 is interposed between the bottom surface 53 of the cylinder 19 and the shoulder 25 when the column is in a fully compressed position. The cushion 45 prevents the shoulder 25 from coming into contact with and damaging the bottom surface 53 of the cylinder 19.

When occupied by a user, the seat 5 imparts a vertical load to the carrier tube 13, which transfers the load to the pneumatic cartridge 17 through the carrier tube shoulder 59. The pneumatic cartridge 17 carries the vertical load through the shaft 23 and transfers it to the bearing set 41 through the shoulder 25 on the shaft 23. The bearing set 41 then transfers the vertical load to the support tube 7 through the support plate 12. Finally, the load is transferred from the support tube 7 to the base 3.

Because the cartridge 17 is secured within the carrier tube 13 at the top of the carrier tube 13, the cartridge 17 is not forced to carry any bending loads. If fixed to a lower portion of the carrier tube, the cartridge would be forced to resist the bending moment applied to it by exerting a coupled reaction force, one reaction force exerted at the point of the cylinder attachment and the other at the point where the shaft is attached to the support tube. Such an arrangement would force the cartridge to carry the bending moment and react against it. The resultant force exchanged between the shaft and the cylinder would accelerate the wear and degradation of the seal interfacing those two elements. To the contrary, when the cylinder is attached at the top of the carrier tube, the cartridge is not forced to carry the moment.

The present invention also relates to a method for assembling the pneumatic height adjustable column. The method includes inserting the pneumatic cartridge 17 in the carrier tube 13 so that the hub 30 passes through the opening 15 in the top portion 14 of the carrier tube 13. When so positioned, the top surface of the cylinder 19 engages the shoulder 59 of the carrier tube 13. A hub fastener 35 is then attached to the hub 30 to secure the pneumatic cartridge 17 within the carrier tube 13. A cushion 45 is disposed on the shaft 23 around the shoulder 25 and a bearing set 41 is disposed on the end of the shaft 27 below the shoulder. The carrier tube 13 and attached pneumatic cartridge 17, including the cushion 45 and the bearing set 41, are then inserted into the support tube 7. The carrier tube 7 is pushed downwardly until the bottom end 27 of the shaft passes through the opening 14 in the support plate 12, thereby capturing the bearing set 41 between the shoulder 25 and the support plate 12. A shaft fastener 51 is then attached to the end of the shaft 23 to secure the shaft to the support plate 12. It should be understood that there is no required order for performing these steps and that they can be reordered so as to achieve the same result.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

I claim:

1. A pneumatic height adjustment column for a chair comprising:

a support tube having a top end which is generally open, and a bottom portion adapted to be mounted to a chair base, the bottom portion including an opening with a smaller diameter than that of the support tube;

a carrier tube having a top portion adapted to be mounted to a support housing, the top portion including an opening with a smaller diameter than that of the carrier tube, the carrier tube also having a generally open bottom end which telescopically engages the top end of the support tube;

a pneumatic cartridge having a cylinder positioned within the carrier tube, the cylinder having a diameter greater than that of the opening in the carrier tube; a shaft extending downward from the cylinder, the shaft having a bottom end which passes through the opening in the bottom of the support tube; and a hub disposed on a top portion of the cylinder which passes through the opening in the top of the carrier tube;

a reusable hub fastener releasably engaging the hub, said hub fastener adapted to be successively disengaged and reengaged with said hub, whereby the position of the hub is maintained through the opening in the top of the carrier tube when said hub fastener is engaged with said hub and whereby the hub is allowed to pass through the opening in the carrier tube when said hub fastener is disengaged from said hub; and a shaft fastener attached to the bottom end of the shaft, whereby the position of the bottom end of the shaft is maintained through the opening in the bottom of the support tube.

2. The column of claim 1 wherein the hub comprises a groove and the hub fastener comprises a resilient member disposed in said groove and an enlarged portion extending from the resilient member to thereby prevent the hub from passing back through the Opening in the top of the carrier tube.

3. The column of claim 2 wherein the groove is a circumferential groove around the hub.

4. The column of claim 2 wherein said hub fastener is made from a steel strip having a thickness of about 0.030 to 0.050 inches.

5. The column of claim 2 wherein said hub fastener is curved.

6. The column of claim 1 wherein the cartridge further comprises an actuating button which extends through the hub.

7. The column of claim 1 wherein the bottom portion of the support tube comprises a bottom end which is generally open and a support plate mounted to the bottom end, said opening in said bottom portion positioned in said support plate.

8. The column of claim 7 wherein said shaft further comprises a shoulder positioned near said bottom end of said shaft and wherein said pneumatic cartridge further comprises a bearing set disposed on said shaft, said bearing set captured between said shoulder and said support plate, whereby the pneumatic cartridge can rotate about a vertical axis.

9. The column of claim 8 wherein said bearing set comprises a first washer, a second washer and a plurality of ball bearings interposed between said washers.

10. The column of claim 8 further comprising a cushion member disposed on said shaft around said shoulder, said cushion member engaging a bottom surface of said cylinder when said pneumatic cartridge is compressed.

11. The column of claim 1 wherein said hub fastener comprises a Y-shaped member having a pair of resilient members defining an opening and an enlarged portion attached to said resilient members, said resilient members releasably engaging said hub of said pneumatic cartridge when said hub is positioned within said opening defined by said resilient members.

12. The column of claim 11 wherein said hub fastener has at least one engagement tab extending inwardly into the opening defined by said resilient members, said at least one engagement tab releasably engaging said hub of said pneumatic cartridge.

13. The column of claim 11 wherein said resilient members have beveled ends.

14. A chair comprising the column of claim 13 and a support housing mounted on said carrier tube, wherein said enlarged portion engages said support housing, whereby said carrier tube is secured to said support housing.

15. A chair comprising the column of claim 1 and a support housing mounted on said carrier tube, wherein said hub fastener engages said support housing, whereby said carrier tube is secured to said support housing.

16. A pneumatic height adjustment column for a chair comprising:
   a support tube;
   a carrier tube disposed in the support tube, said carrier tube having an opening;
   a pneumatic cartridge comprising a cylinder and a hub disposed on a top portion of said cylinder, said hub passing through the opening of the carrier tube;
   a reusable hub fastener releasably engaging the hub, said hub fastener adapted to be successively disengaged and reengaged with said hub, whereby the position of the hub is maintained through the opening in the top of the carrier tube when said hub fastener is engaged with said hub and whereby the hub is allowed to pass through the opening in the carrier tube when said hub fastener is disengaged from said hub.

17. The column of claim 16 wherein the hub comprises a groove and the hub fastener comprises a resilient member disposed in said groove and an enlarged portion extending from the resilient member to thereby prevent the hub from passing back through the opening in a top of the carrier tube.

18. The column of claim 17 wherein the groove is a circumferential groove around the hub.

19. The column of claim 17 wherein said hub fastener is made from a steel strip having a thickness of about 0.030 to 0.050 inches.

20. The column of claim 16 wherein the cartridge further comprises an actuating button which extends through the hub.

21. The column of claim 16 wherein said hub fastener comprises a Y-shaped member having a pair of resilient members defining an opening, said members releasably engaging said hub of said pneumatic cartridge when said hub is positioned within said opening defined by said resilient members.

22. The column of claim 21 wherein said hub fastener has at least one engagement tab extending inwardly into the opening, said at least one engagement tab releasably engaging said hub of said pneumatic cartridge.

23. The column of claim 21 wherein said resilient members have beveled ends.

24. The column of claim 16 wherein said hub fastener is curved.

25. A chair comprising the column of claim 16 and a support housing mounted on said carrier tube, wherein said hub fastener engages said support housing, whereby said carrier tube is secured to said support housing.

26. A method for assembling a pneumatic height adjustment column, the method comprising:
   providing a support tube having a top end which is generally open, and a bottom portion adapted to be mounted to a chair base, the bottom portion having an opening with a smaller diameter than that of the support tube;
   providing a carrier tube having a top portion adapted to be mounted to a support housing, the top portion including an opening with a smaller diameter than that of the carrier tube, the carrier tube also having a generally open bottom end;
   providing a pneumatic cartridge comprising a cylinder, a hub attached to the top of the cylinder and a shaft extending downwardly from said cylinder, said shaft comprising a bottom end;
   inserting the pneumatic cartridge in the carrier tube such that the hub passes through the opening in the top portion;
   slidably moving a hub fastener comprising a resilient member in a lateral inward direction into engagement with said hub such that said resilient member is biased outwardly by said hub during said lateral slidable movement and until said hub fastener is releasably engaged with said hub so as to secure the pneumatic cartridge in the carrier tube;
   inserting the carrier tube into the support tube;
   passing the bottom end of the shaft through the opening in the bottom portion of the support tube;
   securing the bottom end of the shaft with a shaft fastener.

27. The method of claim 26 further comprising:
   disposing a bearing set on the bottom end of the shaft, and capturing said bearing set between the bottom portion of said support tube and a shoulder of said shaft.

28. The method of claim 27 further comprising:
   disposing a cushion on the shaft around said shoulder.

29. The method of claim 26 wherein the step of slidably moving the hub fastener further comprises applying a lateral inward force to an enlarged portion of the hub fastener extending from said resilient member, whereby said resilient member is biased outwardly by the hub as the hub fastener is disposed on the hub.

30. A chair comprising:
   a base;

a support housing;

a support tube having a top end which is generally open, and a bottom portion mounted to said base, said bottom portion having an opening with a smaller diameter than that of the support tube;

a carrier tube having a top portion mounted to said support housing and a bottom portion telescopically received in said top end of said support tube, said top portion having an opening with a smaller diameter than the carrier tube;

a pneumatic cartridge having a cylinder positioned within the carrier tube, the cylinder having a diameter greater than that of the opening in the top portion of the carrier tube; a shaft extending downwardly from the cylinder, the shaft having a bottom end which passes through the opening in the bottom portion of the support tube; and a hub disposed on the top portion of the cylinder extending through the opening in the top portion of the carrier tube;

a hub fastener releasably engaging the hub and support housing, whereby the position of the hub is maintained through the opening in the top of the carrier tube and the carrier tube is releasably secured to the support housing; and a shaft fastener attached to the bottom end of the shaft, whereby the position of the bottom end of the shaft is maintained through the opening in the bottom of the support tube.

31. The chair of claim 30 wherein said hub comprises a groove and said hub fastener comprises a resilient member disposed in said groove.

32. The chair of claim 31 wherein said hub fastener further comprises an enlarged portion extending from the resilient member.

33. The chair of claim 32 wherein said hub fastener further comprises a second resilient member spaced apart from said first resilient member, said resilient members disposed on opposite sides of said hub member.

34. A pneumatic height adjustment column for a chair comprising:

a support tube having a top end which is generally open, and a bottom portion adapted to be mounted to a chair base, the bottom portion including an opening with a smaller diameter than that of the support tube;

a carrier tube having a top portion adapted to be mounted to a support housing, the top portion including an opening with a smaller diameter than that of the carrier tube, the carrier tube also having a generally open bottom end which telescopically engages the top end of the support tube;

a pneumatic cartridge having a cylinder positioned within the carrier tube, the cylinder having a diameter greater than that of the opening in the carrier tube; a shaft extending downward from the cylinder, the shaft having a bottom end which passes through the opening in the bottom of the support tube; and a hub disposed on a top portion of the cylinder which passes through the opening in the top of the carrier tube;

a hub fastener comprising a Y-shaped member having a pair of resilient members defining an opening and an enlarged portion extending from said resilient members, said resilient members releasably engaging said hub when said hub is positioned within said opening defined by said resilient members; and a shaft fastener attached to the bottom end of the shaft, whereby the position of the bottom end of the shaft is maintained through the opening in the bottom of the support tube.

35. The column of claim 34 wherein said hub fastener has at least one engagement tab extending inwardly into the opening defined by said resilient members, said at least one engagement tab engaging said hub of said pneumatic cartridge.

36. The column of claim 35 wherein said resilient members have beveled end portions.

37. A chair comprising the column of claim 34 and a support housing mounted on said carrier tube, wherein said enlarged portion engages said support housing, whereby said carrier tube is secured to said support housing.

38. A pneumatic height adjustment column comprising:

a tube comprising a top portion having an opening;

a pneumatic cartridge comprising a cylinder and a hub disposed on a top portion of said cylinder, said cartridge disposed in said tube such that said hub extends through the opening in the top portion of said tube;

a hub fastener comprising a Y-shaped member having a pair of resilient members defining an opening and an enlarged portion extending from said resilient members, said resilient members releasably engaging said hub when said hub is positioned within said opening defined by said resilient members.

39. The column of claim 38 wherein said hub fastener has at least one engagement tab extending inwardly into the opening, said at least one engagement tab engaging said hub of said pneumatic cartridge.

40. The column of claim 38 wherein said resilient members have beveled end portions.

41. A chair comprising:

a tube comprising a top portion having an opening;

a pneumatic cartridge disposed within said tube, said pneumatic cartridge comprising a hub extending through said opening in said tube;

a support housing mounted on said top portion of said tube; and a hub fastener releasably engaging said hub and said support housing.

42. The chair of claim 41 wherein said hub comprises a groove and said hub fastener comprises a resilient member disposed in said groove.

43. The chair of claim 42 wherein said hub fastener further comprises an enlarged portion extending from said resilient member.

44. The chair of claim 43 wherein said hub fastener comprises a second resilient member extending from said enlarged portion, said resilient members defining an opening between them.

45. The chair of claim 44 wherein said hub fastener further comprises at least one engagement tab extending inwardly into the opening defined by said resilient members, said at least one engagement tab engaging said hub.

46. The chair of claim 44 wherein said resilient members comprise beveled end portions.

47. A pneumatic height adjustment column for a chair comprising:

a tube comprising a top portion having an opening, said tube having a longitudinal axis;

a pneumatic cartridge comprising a cylinder having a longitudinal axis and a hub disposed on a top portion of said cylinder, said cartridge coaxially disposed in said tube such that said hub extends through the opening in the top portion of said tube;

a hub fastener comprising a resilient member releasably engaging said hub, said hub fastener engaged with said hub by slidably moving said resilient member in a lateral inward direction relative to said longitudinal axis so that said resilient member is biased outwardly by said hub during said slidable movement.

48. The column of claim 41 wherein said hub comprises a groove, said resilient member disposed in said groove.

49. The column of claim 41 wherein said hub fastener further comprises an enlarged portion extending from said resilient member.

50. A method for replacing a pneumatic cartridge in a support column, the method comprising:

providing a support tube having a top end which is generally open, and a bottom portion adapted to be mounted to a chair base, the bottom potion having an opening with a smaller diameter than that of the support tube;

providing a carrier tube having a top potion adapted to be mounted to a support housing, the top potion including an opening with a smaller diameter than that of the carrier tube, the carrier tube also having a generally open bottom end, said carrier tube telescopically engaging said support tube;

providing a pneumatic catridge comprising a cylinder, a hub attached to a top of the cylinder and a shaft extending downwardly from said cylinder, said shaft comprising a bottom end, said pneumatic catridge disposed in said carrier tube and said support tube such that the hub passes through the opening in the top potion of said carrier tube and said bottom end of said shaft extends through the opening in the bottom potion of said support tube and is secured with a shaft fastener;

providing a hub fastener having a resilient member releasably engaging said hub;

disengaging said hub fastener from said hub by applying a lateral force to said hub fastener such that said resilient member is biased outwardly by said hub as said hub fastener is disengaged;

disengaging said shaft fastener;

separating said carrier tube from said support tube;

removing said pneumatic cartridge;

inserting a replacement pneumatic cartridge in one of said carrier tube and said support tube, said replacement pneumatic cartridge comprising a cylinder, a hub attached to a top of the cylinder and a shaft extending downwardly from said cylinder, said shaft comprising a bottom end;

telescopically engaging said carrier tube and said support tube such that said hub of said replacement pneumatic cartridge passes through the opening in the top portion of the carrier tube and said bottom end of said shaft extends through the opening in the bottom portion of said support tube;

securing a shaft fastener to said bottom end of said shaft;

releasably engaging said hub of said replacement pneumatic cartridge with said hub fastener by applying a lateral force to said hub fastener such that said resilient member is biased outwardly by said hub.

51. A pneumatic height adjustment column for a chair comprising:

a support tube;

a carrier tube disposed in said support tube, said carrier tube having an opening;

a pneumatic cartridge disposed in said carrier tube, said pneumatic cartridge comprising a cylinder and a hub disposed on a top portion of said cylinder, said hub passing through the opening of the carrier tube;

a hub fastener releasably engaging the hub, said hub fastener comprising a Y-shaped member having a pair of resilient members defining an opening, said resilient members releasably engaging said hub of said pneumatic cartridge when said hub is positioned within said opening defined by said resilient members, whereby the position of the hub is maintained through the opening of the carrier tube.

52. The column of claim 51 wherein said hub fastener has at least one engagement tab extending inwardly into the opening, said at least one engagement tab releasably engaging said hub of said pneumatic cartridge.

53. The column of claim 51 wherein said resilient members comprise beveled end portions.

* * * * *

UNITED STATES PATENT AND TRADEMARK OFFICE
CERTIFICATE OF CORRECTION

PATENT NO. : 5,740,997
DATED : April 21, 1998
INVENTOR(S) : Steven M. Van Wieren It is certified that error appears in the above-identified patent and that said Letters Patent is hereby corrected as shown below:

On the title page, item [75] inventor, should read --Steven M. Van Wieran--.

On the Title Page

In column 1, item [75], please change "Grandvillo" to --Grandville--.

In column 1, line 21, please change "4,979,708" to --4,979,718--.

In claim 2, line 5, please change "Opening" to --opening--.

In claim 21, line 3, after "said", please insert --resilient--.

Signed and Sealed this

Tenth Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,740,997
DATED : April 21, 1998
INVENTOR(S) : Steven M. Van Wieren It is certified that error appears in the above-identified patent and that said Letters Patent is hereby corrected as shown below:

Title page,
Item [75] inventor, should read -- Steven M. Van Wieran --.

Signed and Sealed this

Ninth Day of October, 2001

*Attest:*

NICHOLAS P. GODICI
*Attesting Officer*   *Acting Director of the United States Patent and Trademark Office*